United States Patent
Nazri et al.

(10) Patent No.: US 7,589,143 B2
(45) Date of Patent: Sep. 15, 2009

(54) METHOD FOR REDUCING CURE SHRINKAGE OF A THERMOSET RESIN

(75) Inventors: Gholam-Abbas Nazri, Bloomfield Hills, MI (US); Chen-Shih Wang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 582 days.

(21) Appl. No.: 11/232,710

(22) Filed: Sep. 22, 2005

(65) Prior Publication Data

US 2007/0066717 A1    Mar. 22, 2007

(51) Int. Cl.
*C08K 3/04* (2006.01)
(52) U.S. Cl. ....................... 524/495; 524/496
(58) Field of Classification Search ................. 524/495, 524/496
See application file for complete search history.

(56) References Cited

U.S. PATENT DOCUMENTS

| 2004/0202603 | A1 | 10/2004 | Fischer et al. |
| 2005/0025694 | A1 | 2/2005 | Zhang et al. |
| 2006/0217482 | A1* | 9/2006 | Lukehart et al. ............ 524/495 |

* cited by examiner

*Primary Examiner*—Edward J Cain

(57) ABSTRACT

A method for reducing cure shrinkage of a thermoset resin includes forming a plurality of surface modified nanofibers. The surface modified nanofibers are formed by soaking nanofibers in an oxidizing acidic solvent. An oxidizing agent is added to the soaking nanofibers, thereby generating heat sufficient for at least one of in-situ oxidation and in-situ exfoliation of a subsurface of each of the nanofibers. Excess oxidizing agent and acidic solvent are removed from the nanofibers, which are then dried. The dried nanofibers have reduced surface hydrophobicity. The surface modified nanofibers are substantially uniformly dispersed into the thermoset resin. The surface modified nanofibers are adapted to reduce cure shrinkage of the thermoset resin during subsequent curing processes.

11 Claims, 2 Drawing Sheets

METHOD FOR REDUCING CURE SHRINKAGE OF A THERMOSET RESIN

TECHNICAL FIELD

The present disclosure relates generally to polymer composites, and more particularly to a method for reducing cure shrinkage of a thermoset resin.

BACKGROUND

Carbon nanofibers have a tendency to interact and entangle themselves with other carbon nanofibers. This may be due, at least in part, to the physiochemical properties of the carbon nanofiber surfaces. Further, these properties may also, in some instances, render the nanofibers incompatible with the chemical nature of certain polymeric systems. Problems may arise when attempting to uniformly distribute carbon nanofibers into a polymeric system, due in part, to the potential agglomeration of the nanofibers and to the potential incompatibility of the nanofibers with the polymeric system. Further, the agglomeration of nanofibers may substantially reduce the effect of the nanofibers as reinforcement fillers in a polymeric system. Still further, the agglomeration of nanofibers may, in some instances, cause local defects, which may lead to reduced mechanical properties of the polymeric system.

As such, it would be desirable to provide nanofibers having reduced fiber-to-fiber interaction and increased compatibility with polymeric systems.

SUMMARY

A method for reducing cure shrinkage of a thermoset resin includes forming a plurality of surface modified nanofibers. The surface modified nanofibers are formed by soaking nanofibers in an oxidizing acidic solvent. An oxidizing agent is added to the soaking nanofibers, thereby generating heat sufficient for at least one of in-situ oxidation and in-situ exfoliation of a subsurface of each of the nanofibers. Excess oxidizing agent and acidic solvent are removed from the nanofibers, which are then dried. The dried nanofibers have reduced surface hydrophobicity. The surface modified nanofibers are substantially uniformly dispersed into the thermoset resin. The surface modified nanofibers are adapted to reduce cure shrinkage of the thermoset resin during subsequent curing processes.

BRIEF DESCRIPTION OF THE DRAWINGS

Objects, features and advantages of embodiments of the present disclosure may become apparent by reference to the following detailed description and drawing.

DETAILED DESCRIPTION OF THE EMBODIMENTS

Embodiment(s) of the surface modified nanofibers disclosed herein have a tendency to remain disentangled from each other. Without being bound to any theory, it is believed that the reduced attraction between the individual fibers advantageously allows the nanofibers to be substantially uniformly dispersed in a polymer system, thereby producing fiber reinforced polymer composites with improved chemical and/or physical properties. Non-limitative examples of chemical and/or physical properties include increased thermal conductivity, decreased thermal expansion coefficient, increased electrical conductivity, and/or the like, and/or increased mechanical strength, modulus, and/or the like. Further, the uniformly dispersed nanofibers may be added to thermoset polymers to substantially reduce polymer shrinkage during subsequent curing processes. Non-limitative examples of subsequent curing processes include those processes used to achieve desirable dimension stability, surface smoothness, and/or appearance. It is to be understood that reducing cure shrinkage of a thermoset resin may be desirable in the production of composite workpieces having high dimensional precision and/or high surface quality.

Figure 1:
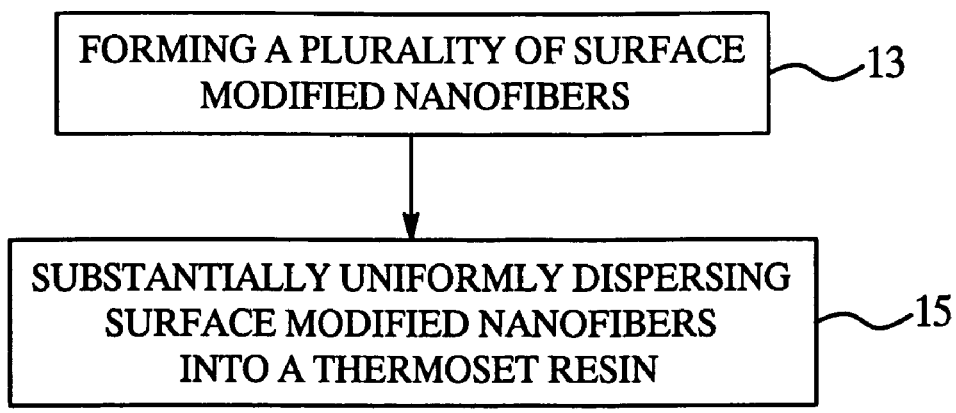
FIG. 1 is a flow diagram depicting an embodiment of a method for reducing cure shrinkage of a thermoset resin.

Referring now to FIG. 1, an embodiment of a method for reducing cure shrinkage of a thermoset resin is depicted. Generally, an embodiment of the method includes forming a plurality of surface modified nanofibers, as shown at reference numeral 13, and substantially uniformly dispersing the plurality of surface modified nanofibers into the thermoset resin, as shown at reference numeral 15. It is to be understood that the plurality of surface modified nanofibers advantageously assists in reducing cure shrinkage of the thermoset resin during subsequent curing processes.

In an embodiment, the plurality of surface modified nanofibers is formed by soaking the nanofiber(s) in an oxidizing acidic solvent. Any suitable nanofiber(s) may be selected. In an embodiment, the nanofibers are carbon nanofibers. A non-limitative example of suitable nanofibers includes vapor grown carbon nanofibers.

The nanofibers may be soaked in the oxidizing acidic solvent for a predetermined amount of time. In an embodiment, the predetermined amount of time ranges from about 1 minute to about 60 minutes. In an alternate embodiment, the predetermined amount of time is less than about 5 minutes. It is to be understood that any suitable acidic solvent may be used to soak the nanofiber(s). Non-limitative examples of such oxidizing acidic solvents include sulfuric acid (a non-limitative example of which is sulfuric acid with a molarity exceeding 14), perchlorates, oxo-acids, peroxides, and/or combinations thereof.

An oxidizing agent is added to the soaking nanofibers. It is to be understood that the oxidizing agent advantageously generates heat sufficient for initiating in-situ oxidation and/or in-situ exfoliation of a subsurface of each of the nanofibers. It is to be further understood that the oxidizing agent may also generate polar functionality of the nanofiber surfaces.

Non-limitative examples of oxidizing agents include at least one of peroxides, superoxides of transition metals (non-limitative examples of which include those transition metals having an oxidation state greater than about 3 valence states), superoxides of non-transition metals (non-limitative examples of which include those non-transition metals having an oxidation state greater than about 3 valence states), polyanions, polyoxometalates, and combinations thereof. Examples of suitable superoxides of transition metals include, but are not limited to iron oxides, chromium oxides, manganese oxides, and/or combinations thereof. Examples of suitable polyanions include, but are not limited to, permanganates, tungstates, and/or molybdates, and/or combinations thereof.

In an embodiment of the method, the nanofiber(s) may be soaked in water prior to being soaked in the oxidizing acidic solvent, and/or prior to the addition of the oxidizing agent. In a non-limitative example, the nanofiber(s) are soaked in water, and the oxidizing agent is added prior to the addition of the oxidizing acidic solvent.

After and/or during the oxidation and/or exfoliation of the nanofibers, surface modifying agents (non-limitative examples of which include polyalcohols, polyesters, polyethers, and/or the like, and/or combinations thereof) may optionally be added to the soaking nanofibers.

Excess oxidizing agent and acidic solvent may then be removed. In an embodiment, removal of the agent and solvent is accomplished by rinsing the nanofibers with an aqueous solvent (non-limitative examples of which include water, a water and polyalcohol mixture, a water and polyethylene oxide mixtures, and combinations thereof).

In an embodiment of the method, a surfactant (e.g. a surfactant solution) may also be added to the nanofibers. It is to be understood that suitable surfactants include, but are not limited to, those having molecules and/or polymers that are compatible with the treated nanofibers and/or the polymer matrix (described further hereinbelow). Non-limitative examples of such surfactants include polyethylene oxide, polyethers, polyesters, glycols, and/or combinations thereof.

The rinsed nanofibers may then be dried. Drying may be accomplished at a temperature ranging from about 50° C. to about 110° C. for a time ranging from about 4 hours to about 24 hours.

The surface modified nanofibers are then added to a thermoset resin. The thermoset resin may include a polymer matrix, a non-limitative example of which includes an epoxy resin. Other examples of suitable thermoset resins include, but are not limited to polyurethanes, phenolic resins, phenolic-formaldhyde polymers, two component epoxy resins, acrylics, polyimides, polyalkylsilicones, and/or combinations thereof.

The modified surface of the nanofibers assists in the substantially uniform distribution of the fibers throughout the thermoset resin. It is to be understood that the resulting surface treated/modified nanofibers have a reduced surface hydrophobicity, when compared to non-surface modified nanofibers. Without being bound to any theory, it is believed that the modified surface nanofibers (having reduced hydrophobicity) advantageously substantially lack the tendency to entangle themselves together, thereby allowing for substantially uniform distribution.

In an embodiment, the surface modified nanofibers are mixed in an interface polymer prior to being added to the thermoset resin. It is to be understood that the interface polymer is generally compatible with both the surface modified nanofibers and the thermoset resin, thereby advantageously contributing to the uniform distribution of the surface modified nanofibers throughout the thermoset resin. Non-limitative examples of an interface polymer include polymers containing heteroatoms (such as, for example, oxygen and nitrogen), polyethylene oxides, polypropylene oxides, polyimides, copolymers thereof, and/or combinations thereof.

Figure 2:
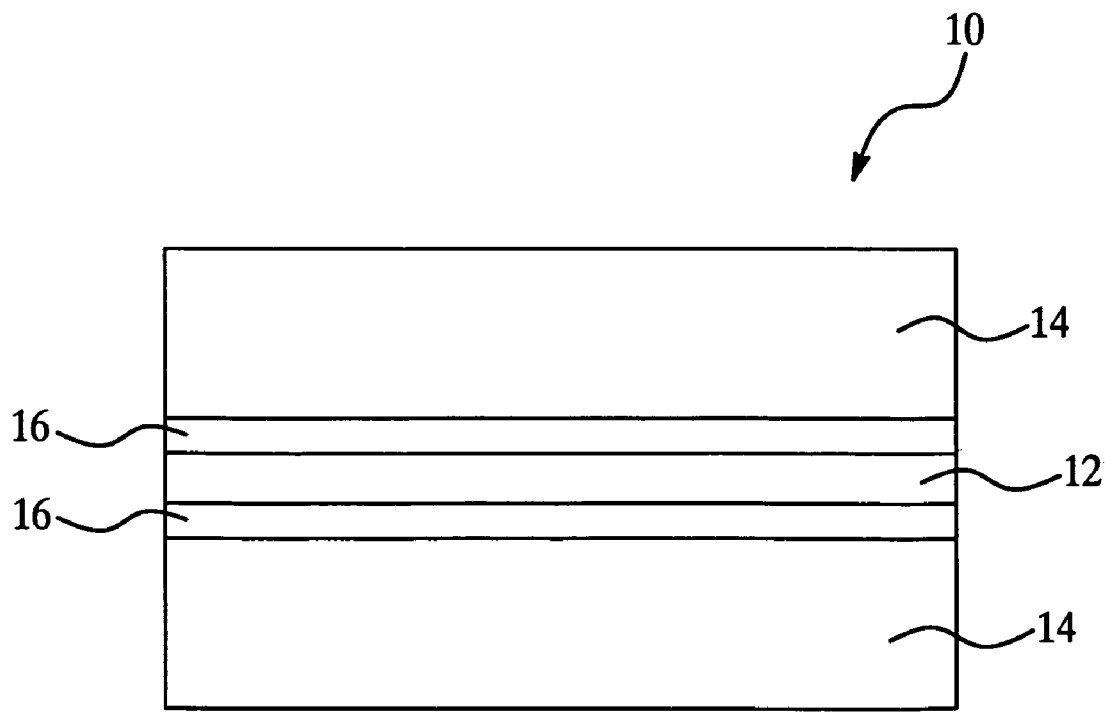
FIG. 2 is a schematic, cross-sectional view of a reinforced polymeric structure.

Referring now to FIG. 2, an embodiment of a reinforced polymeric structure 10 is depicted. In this non-limitative embodiment, one surface modified nanofiber 12 is shown dispersed in the thermoset resin 14 for illustrative purposes. It is to be understood that many nanofibers 12 may be substantially uniformly dispersed throughout the thermoset resin 14. In this embodiment, the nanofiber 12 is shown having the interface polymer 16 established thereon.

Figure 3:
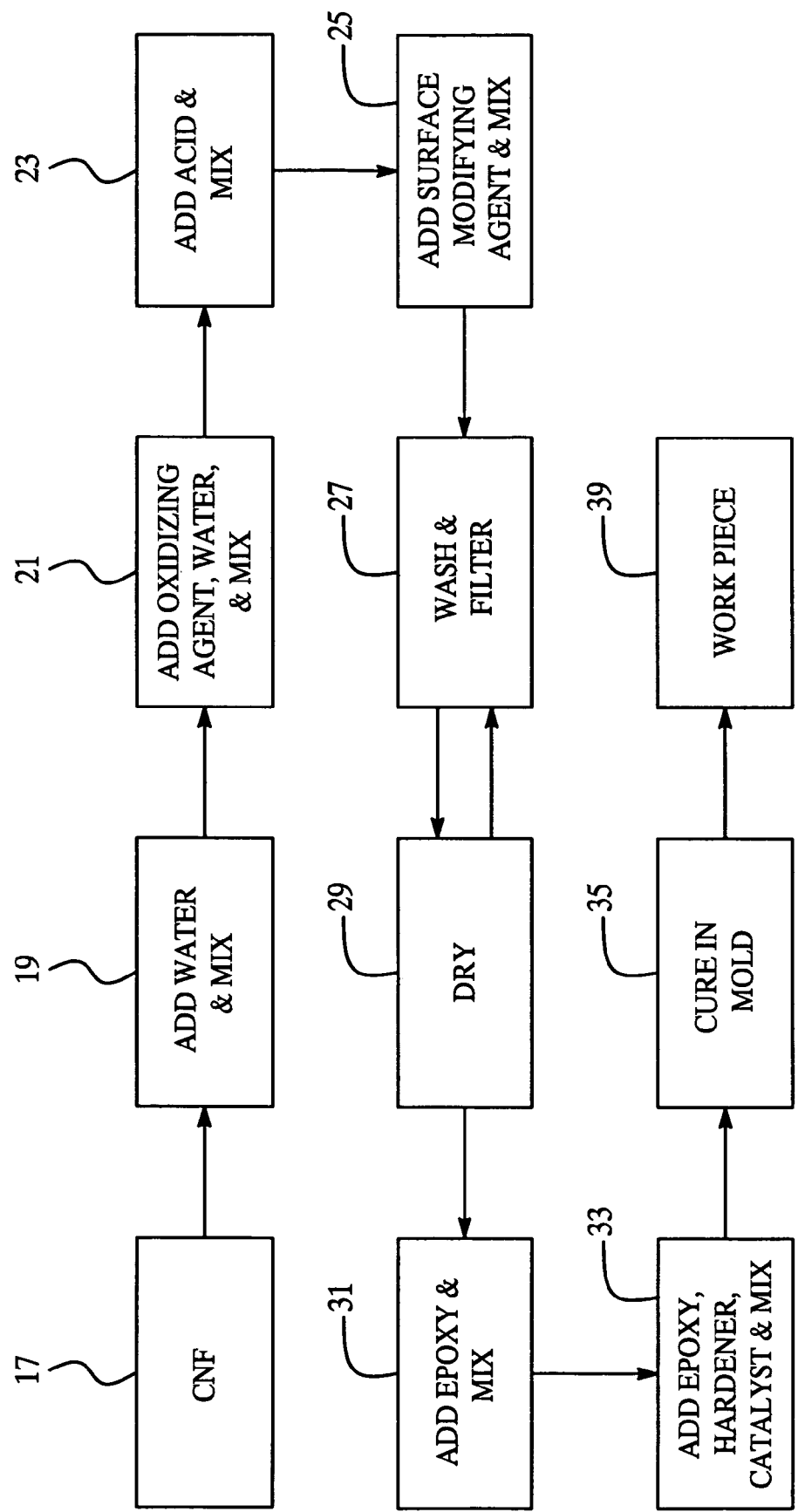
FIG. 3 is a flow diagram depicting a detailed embodiment of a method for reducing cure shrinkage of a thermoset resin.

FIG. 3 illustrates an embodiment of a method of forming a workpiece incorporating the surface-modified nanofibers 12 therein. Carbon nanofibers (CNF), as shown at reference numeral 17, are added to and mixed in water, as shown at reference numeral 19. An oxidizing agent and additional water are added to the water/nanofiber mixture, as depicted at reference numeral 21. Acid is mixed into the water/nanofiber/oxidizing agent mixture, as shown at reference numeral 23. This embodiment of the method includes adding a surface modifying agent to the acid/water/nanofiber/oxidizing agent mixture, as shown at reference numeral 25.

The mixture is then washed and filtered, as depicted at reference numeral 27, and then dried, as depicted at reference numeral 29. It is to be understood that the washing, filtering, and drying steps may be repeated as desired, as indicated by the forward and reverse arrows between boxes 27, 29.

In this non-limitative embodiment, an epoxy is added to the dried mixture, as shown at reference numeral 31.

Depending, at least in part, on the workpiece to be formed, the method may include adding additional epoxy, hardeners, and/or catalysts (as shown at reference numeral 33) to the epoxy mixture formed at reference numeral 31. The resulting mixture may be cured in a mold, as depicted at reference numeral 35; thereby forming the workpiece, as depicted at reference numeral 37.

To further illustrate embodiment(s) of the present disclosure, the following examples are given. It is to be understood that these examples are provided for illustrative purposes and are not to be construed as limiting the scope of embodiment(s) of the present disclosure.

EXAMPLE 1

About 50 grams of carbon nanofibers (commercially available under the tradename PYROGRAF III from Applied Sciences, Inc., located in Cedarville, Ohio) is mixed with water (ranging from about 60 ml to about 100 ml). The mixture is stirred for about 5 to 10 minutes. About 10 grams of chrome trioxide is mixed into the carbon nanofiber/water mixture by adding $CrO_3$ powder or an aqueous solution of chrome trioxide (e.g. 25 ml of 4 mole $CrO_3$ solution). This solution is stirred vigorously for about 5 to about 10 minutes to increase the wetting on the carbon nanofibers.

The carbon nanofibers are mixed with and soaked in about 150 ml to 200 ml of sulfuric acid for about 5 minutes. About 100 ml to 200 ml of water are mixed in the acid soaked nanofibers for another 5 minutes. The mixture is filtered through a paper sieve, and the filtrate is collected after filtration or after a mild washing with water.

A surfactant solution is added to the filtrate and is mixed substantially continuously for about 10 to about 30 minutes. This mixture is filtered. The treated carbon nanfibers are dried at a temperature ranging from about 50° C. to about 110° C. for a time ranging from about 4 hours to about 24 hours.

The dried carbon nanofibers are added into a warm epoxy resin to make a master batch having about 5 wt. % to about 10 wt. % surface modified nanofibers. The master batch is stirred at 2000 rpm to 5000 rpm, using a laboratory intensive mixer, for about 5 minutes to about 15 minutes at temperatures ranging from room temperature to about 50° C.

EXAMPLE 2

An epoxy formulation included 100 parts by weight of diglycidyl ether bisphenol-A resin (commercially available under the tradename DER 383 from The Dow Chemical Company, located in Midland, Mich.); 80 parts by weight of methyltetrahydrophthalic anhydride hardener (commercially available from Lonza, located in Allendale, N.J.); and 2 parts by weight of 1,2-dimethyl imidazole catalyst (commercially available under the tradename DMI from BASF Corp., located in Florham Park, N.J.). All samples (each having a different amount of surface modified carbon nanofibers) were cast in a 12"×12"×0.125" mold and cured in a hot air oven for about 20 minutes at 90° C., followed by post curing for about 2 hours at 150° C. The following table exhibits cure shrinkage volume percent of the various samples including different amounts of surface modified carbon nanofibers.

TABLE 1

| SAMPLE | Carbon Nanofiber (Wt. %) | Carbon Nanofiber Description | Cure Shrinkage (Vol. %) |
|---|---|---|---|
| 1 | 0.0 | — | 1.61 |
| 2 | 3.0 | As received, no modification | 1.38 |
| 3 | ~5 | dried, acidic, 10% masterbatch | 0.75 |
| 4 | ~5 | wet, acidic, 10% masterbatch | 1.28 |
| 5 | ~3 | wet, acidic, 10% masterbatch | 1.19 |
| 6 | 3.0 | dried, acidic, 10% masterbatch | 0.19 |
| 7 | 2.1 | dried, acidic, 4% masterbatch | 0.52 |

As depicted, the volume shrinkage of the samples (3-7) having surface modified carbon nanofibers is less than the sample (1) having no surface modified carbon nanofibers and the sample (2) having 3% unmodified carbon nanofibers. Further, the dried surface modified carbon nanofibers appeared to be more effective in reducing the cure shrinkage of the samples than the wet surface modified carbon nanofibers.

Embodiment(s) of the surface modified nanofibers include, but are not limited to the following advantages. It is believed that reduced interaction between the individual nanofibers advantageously allows the nanofibers to be substantially uniformly dispersed in a polymer system, thereby producing fiber reinforced polymer composites with improved chemical and/or physical properties. Further, the uniformly dispersed nanofibers may be added to thermoset polymers to substantially reduce polymer shrinkage during subsequent curing processes.

While several embodiments have been described in detail, it will be apparent to those skilled in the art that the disclosed embodiments may be modified. Therefore, the foregoing description is to be considered exemplary rather than limiting.

The invention claimed is:

1. A method for reducing cure shrinkage of a thermoset resin, the method comprising:
    forming a plurality of surface modified nanofibers, the plurality of surface modified nanofibers being formed by:
        soaking a plurality of nanofibers in an oxidizing acidic solvent;
        adding an oxidizing agent to the soaking nanofibers, thereby generating heat sufficient for at least one of in-situ oxidation and in-situ exfoliation of a subsurface of each of the plurality of nanofibers;
        removing excess oxidizing agent and oxidizing acidic solvent from the plurality of nanofibers; and
        drying the plurality of nanofibers, thereby forming the plurality of surface
    modified nanofibers having reduced surface hydrophobicity; and
    substantially uniformly dispersing the plurality of surface modified nanofibers into the thermoset resin, the plurality of surface modified nanofibers adapted to reduce cure shrinkage of the thermoset resin during subsequent curing processes.

2. The method as defined in claim 1 wherein the oxidizing agent is a transition metal in an oxidation state greater than about 3 valence states.

3. The method as defined in claim 1 wherein the oxidizing agent is at least one of peroxides, superoxides of transition metals, superoxides of non-transition metals, polyanions, polyoxometalates, and combinations thereof.

4. The method as defined in claim 1 wherein soaking the plurality of nanofibers in the oxidizing acidic solvent is accomplished for a time ranging between about 1 minute and about 60 minutes.

5. The method as defined in claim 1, further comprising mixing the plurality of nanofibers with a surfactant solution prior to drying the plurality of nanofibers.

6. The method as defined in claim 1, wherein prior to soaking the plurality of nanofibers in the oxidizing acidic solvent and adding the oxidizing agent, the plurality of nanofibers is soaked in water.

7. The method as defined in claim 1 wherein removing excess oxidizing agent and oxidizing acidic solvent is accomplished by rinsing the soaking plurality of nanofibers having the oxidizing agent therein with water.

8. The method as defined in claim 1 wherein the plurality of nanofibers is carbon nanofibers.

9. The method as defined in claim 1, further comprising mixing the surface modified nanofibers in an interface polymer prior to substantially uniformly mixing the surface modified nanofibers in the thermoset resin.

10. A thermoset polymer, comprising:
    a polymer matrix;
    a plurality of surface modified nanofibers substantially uniformly dispersed throughout the polymer matrix, the plurality of surface modified nanofibers i) having an altered polarity resulting from an in-situ oxidation process involving an oxidizing acidic solvent and an oxidizing agent, and ii) adapted to substantially reduce the cure shrinkage of the thermoset polymer during curing processes; and
    an interface polymer mixed throughout the polymer matrix, the interface polymer being compatible with the polymer matrix and the surface modified nanofibers.

11. The thermoset polymer as defined in claim 10 wherein the polymer matrix is an epoxy resin.

\* \* \* \* \*